United States Patent
Sandberg et al.

(10) Patent No.: US 6,886,180 B1
(45) Date of Patent: Apr. 26, 2005

(54) IMPLEMENTING CABLE MODEM FUNCTIONS ON A HOST COMPUTER

(75) Inventors: Jabe A. Sandberg, Chandler, AZ (US); Dmitrii Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 09/640,480

(22) Filed: Aug. 16, 2000

(51) Int. Cl.$^7$ ............................................. H04N 7/173
(52) U.S. Cl. ................... 725/111; 725/109; 725/51; 370/401; 370/419; 370/420; 370/428; 370/486; 370/487
(58) Field of Search ................................ 725/111, 109, 725/51; 370/401, 469, 419–421, 428, 486–490, 89

(56) References Cited

U.S. PATENT DOCUMENTS

| | | | | |
|---|---|---|---|---|
| 5,640,444 A | * | 6/1997 | O'Sullivan | 455/552.1 |
| 6,216,171 B1 | * | 4/2001 | Isono et al. | 709/250 |
| 6,401,059 B1 | * | 6/2002 | Shen et al. | 703/27 |
| 6,449,291 B1 | * | 9/2002 | Burns et al. | 370/516 |
| 6,507,592 B1 | * | 1/2003 | Hurvig et al. | 370/503 |
| 6,618,386 B1 | * | 9/2003 | Liu et al. | 370/401 |
| 6,618,387 B1 | * | 9/2003 | Liu et al. | 370/401 |
| 6,629,288 B1 | * | 9/2003 | Bernath et al. | 714/807 |
| 6,651,105 B1 | * | 11/2003 | Bhagwat et al. | 709/239 |
| 6,751,230 B1 | * | 6/2004 | Vogel et al. | 370/432 |
| 6,757,829 B1 | * | 6/2004 | Laczko et al. | 713/187 |
| 6,757,909 B1 | * | 6/2004 | Maruo et al. | 725/111 |
| 6,782,884 B1 | * | 8/2004 | Chen et al. | 725/111 |
| 6,802,032 B1 | * | 10/2004 | Budinger et al. | 714/46 |
| 2002/0018463 A1 | * | 2/2002 | Rabenko | 370/352 |

\* cited by examiner

Primary Examiner—John Miller
(74) Attorney, Agent, or Firm—Alan Pedersen-Giles

(57) ABSTRACT

The present invention processes cable modem functions on a host computer. The cable modem receives hardware specific modem functions and transfers these functions to the host computer. An abstraction layer in the host computer receives the functions and converts the functions to/from hardware specific functions. The abstraction layer may be a DOCSIS abstraction layer. A firmware emulator (firmulator) then receives and processes the modem functions. The firmware emulator includes a plurality of state machines and networking protocol agents.

17 Claims, 4 Drawing Sheets

IMPLEMENTING CABLE MODEM FUNCTIONS ON A HOST COMPUTER

TECHNICAL FIELD

This invention relates to cable modems, and more particularly to migration of functions from a cable modem to its host computer.

BACKGROUND

With the recent rise in popularity of the Internet, many home computer users are using a modem to access the Internet through the Public Switched Telephone Network ("PSTN") using home telephone lines. The PSTN provides a dedicated circuit from the modem to a server located at an Internet service provider. The server functions as a gateway to the Internet. However, the bandwidth of typical home telephone lines is relatively small, which limits the speed that information can be received from the Internet.

As an alternative to using telephone lines, the Internet can be accessed through coaxial cables using a cable modem. Coaxial cables provide greater bandwidth than home telephone lines and are widely available to existing cable television subscribers. The greater bandwidth also enables new applications such as telephony-over-cable that are not necessarily associated with the Internet.

Unlike telephone lines, existing coaxial cable infrastructure typically does not provide a dedicated circuit to the home user. Instead, multiple users are usually coupled to the same coaxial cable leading to a server located at an Internet service provider. In addition, television signals are also usually sent on the same coaxial cable. Therefore, Internet or other broadband service providers that use coaxial cables must send and receive both data packets that contain data, and control packets. The control packets provide the computer and the cable modem with information needed to send and receive the data packets, such as what frequency packets flowing out of the cable modem should be transmitted on, what should its transmitter power level be, how many packets may be transmitted, what data packets on the coaxial cable are intended for the cable modem, etc.

Known cable modems typically have associated with them specialized processors, memory, and software (or firmware) for capturing and processing the data packets and control packets. This specialized modem hardware and software (or firmware) is in addition to the hardware and software within the computer, and therefore increases the costs of equipping a home computer so that it can utilize coaxial cable for broadband access to data services such as the Internet.

DESCRIPTION OF DRAWINGS

Features and advantages of the invention will become more apparent upon reading the following detailed description and upon reference to the accompanying drawings.

DETAILED DESCRIPTION

Figure 1:
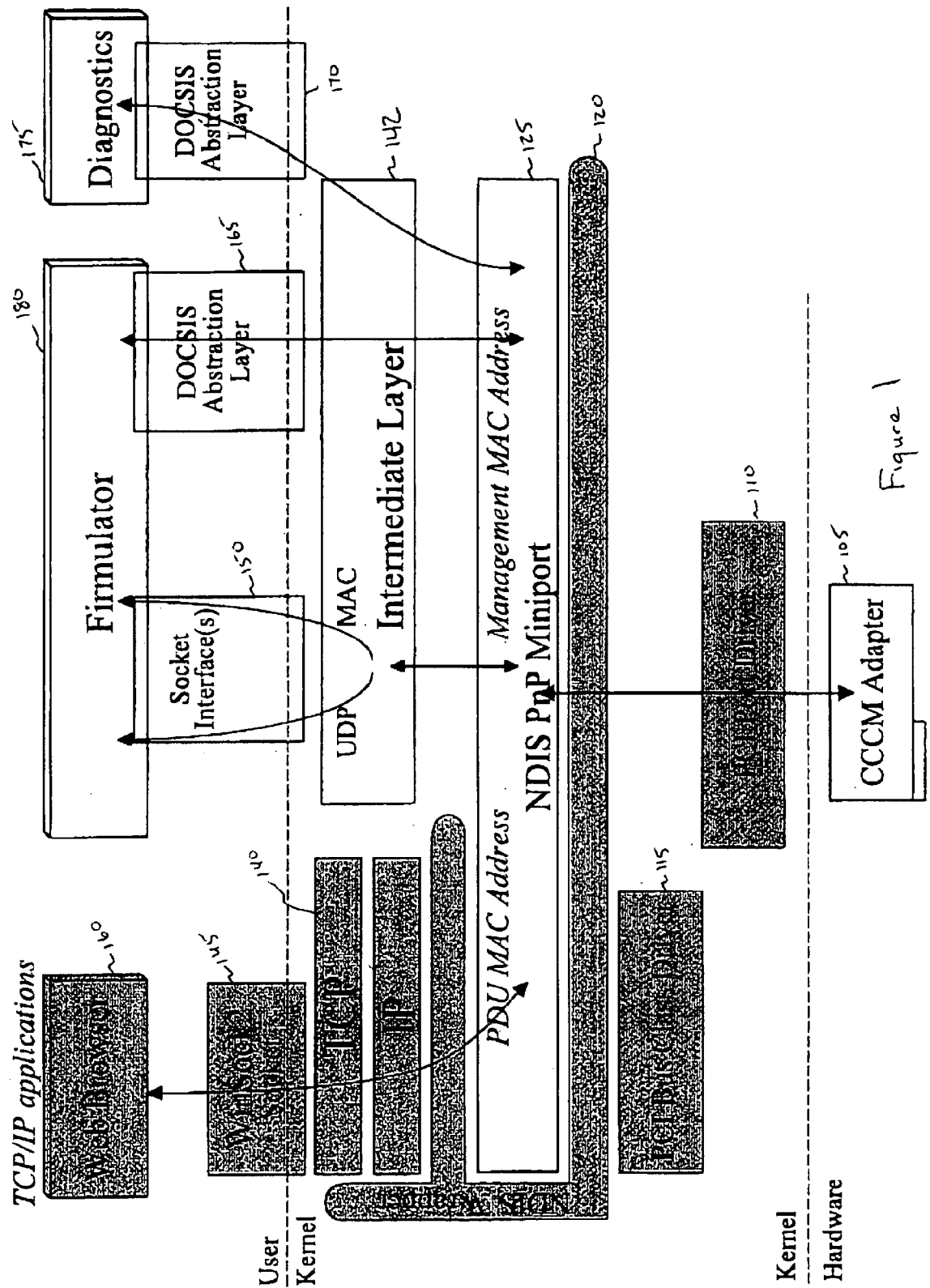
FIG. 1 is a block diagram of the cable modem host migrated architecture according to an embodiment of the present invention.

FIG. 1 illustrates the overall design of a cable modem host migrated architecture. A CPE Controlled Cable Modem (CCCM) Adapter 105 transfers data to the operating system kernel through a PCI Port Driver 110 to a NDIS (Network Driver Interface Specification) Miniport driver 125. The kernel may also include a PCI bus class driver 115. The NDIS Miniport 125 provides for protocol translation, packet queuing, and communication with the Media Access Controller (MAC). The NDIS wrapper 120 surrounds the NDIS Miniport 125. The NDIS wrapper 120 insulates the network card drivers from protocol drivers and at the same time hides certain details of the hardware platform on which the driver is run. The NDIS Miniport-125 interfaces with higher-level drivers and communicates with a user application such as a web browser 160 through standard TCP/IP interfaces 140 and a socket interface 145.

The NDIS Miniport 125 also interfaces with a firmware emulator ("firmulator") 180 and a diagnostics module 175 through Data Over Cable Service Interface Specification (DOCSIS) abstraction layers 165, 170 and possibly through the intermediate driver 142. The DOCSIS defines interface requirements for cable modems involved in high-speed data distribution over cable television networks. The DOCSIS abstraction layers 165, 170, in conjunction with the NDIS miniport 125 converts hardware-independent functions into hardware-specific functions. This leaves the firmulator 180 universally applicable, regardless of the underlying hardware. Some of the functions performed by the DOCSIS abstraction layers 165, 170 in conjunction with the NDIS miniport 125 include hardware initialization, tuning upstream and downstream frequencies, querying the signal state, adjusting power and timing, ranging request and response, and EEPROM read and write. Of course, other functions may also be performed by the DOCSIS abstraction layers 165, 170. The NDIS miniport 125 may also interface to the firmulator 180 through the intermediate layer 142 and socket interfaces 150 having helper DLL (dynamic link libraries).

The use of the above items such as the firmulator 180 and the DOCSIS abstraction layers 165, 170 allows functions that were previously implemented in a cable modem to be transferred to the host computer. This eliminates the need for state machines on the cable modem by taking advantage of the hardware and software of the host computer. By executing the state functions on the host computer, devices such as embedded chips (CPU, memory) and software (RTOS and firmware) may be removed from the cable modem. This allows for a lower cost and simpler cable modem design.

Figure 2:
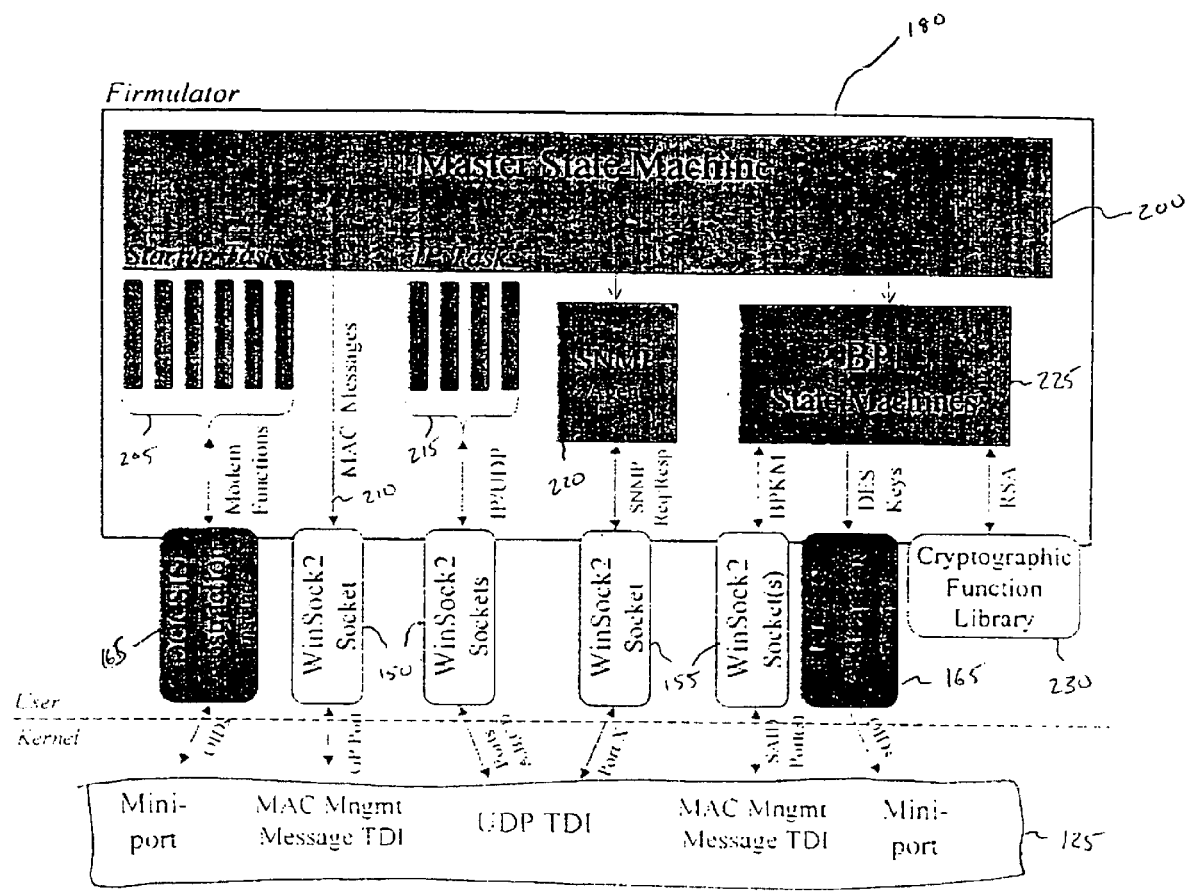
FIG. 2 is a block diagram of the firmulator of FIG. 1 according to an embodiment of the present invention.

The design of the firmulator 180 according to one embodiment of the invention is shown in FIG. 2. The firmulator 180 includes a master state machine 200, a SNMP (Simple Network Management Protocol) agent 220, and BPI (Baseline Privacy Interface) state machines 225 besides DOCSIS control state machines 205, 215.

The master state machine 200 may perform many tasks, possibly including receiving, parsing, and routing MAC management messages, maintaining a global database of volatile and non-volatile data, controlling the DOCSIS state machine functions at a high level, managing execution threads for tasks which must execute simultaneously, providing a central error logging and reporting facility, and interfacing to a user application. The master state machine 200 executes (DOCSIS) startup tasks 300–365 using DAL to translate and communicate with the NDIS miniport driver 125. The commands and data transferred to the NDIS miniport 125 includes modem functions which are converted by the DOCSIS abstraction layer 165. MAC management messages 210 are transferred through one or more socket interfaces 150 to and from the NDIS Miniport 125. The master state machine 200 may also transfer a plurality of IP data 215 to and from the NDIS miniport 125 through the socket interface 150 and the TDI interface 135.

The master state machine 200 also communicates with the SNMP agent 220 and the BPI state machine 225. The SNMP agent 220 is a full SNMP client which manages network management message parsing and execution. The SNMP agent 220 interfaces with the NDIS miniport 125 through the socket interface 150 and the TDI interface 130 and through a DAL (not shown).

The BPI state machine 225 manages threads for per-stream encryption and/or decryption key handling. The BPI state machine 225 interfaces to (or may contain) the cryptographic function library 230. The BPI state machine 225 interfaces with the MAC management message stream through one or more socket interfaces 150. The intermediate driver may provide for routing of the MAC management messages to particular BPI state machine components. The BPI state machine 225 also interfaces with the NDIS miniport 125 through one or more DOCSIS abstraction layer 165.

Figure 3:
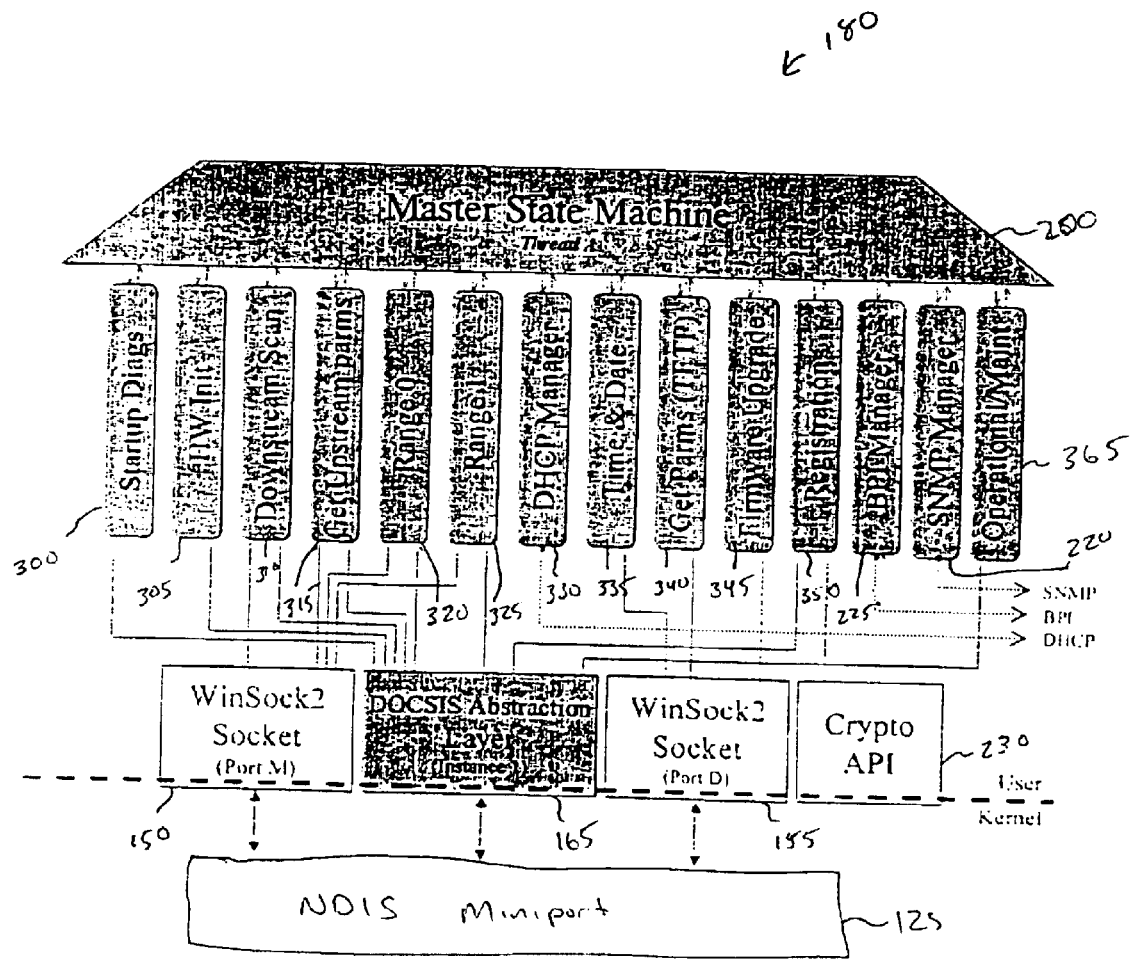
FIG. 3 is a block diagram of the internal architecture of the firmulator of FIG. 2.

The internal architecture of the firmulator 180 is further illustrated in FIG. 3. The firmulator 180 includes a plurality of sub-state machines and agents for networking protocols. As defined in DOCSIS, these include startup diagnostics 300, hardware initialization 305, downstream scan 310, get upstream parameters 315, Range 0 320, Range 1 325, a Dynamic Host Control Protocol (DHCP) manager 330, time and date 335, Trivial File Transfer Protocol (TFTP) parameters 340, firmware upgrade 345, registration 350, the BPI manager 225, the SNMP manager 220, and operational and maintenance 365. The state machines execute the DOCSIS modem control engine state machine functions and manage independent processes. Each of the state machines may be implemented as objects to enhance interchangeability. If implemented as objects, the state machines would includes a "run" method for startup and a "do" method for overriding normal process flow.

The state machines interface with the kernel through the DOCSIS abstraction layer 165 or the socket interfaces 150, 150. The startup diagnostics 300, hardware initialization 305, downstream scan 310, get upstream parameters 315, Range 0 320, Range 1 325, registration 350, and operational and maintenance 365 state machines each interface with the DOCSIS abstraction layer 165. The downstream-scan 310, get upstream parameters 315, Range 0 320, and Range 1 325 interface through the socket interface 150. The time and date 335, Trivial File Transfer Protocol (TFTP) parameters 340, and firmware upgrade 345, interface through the socket interface 150.

Although the invention is described with respect to a DOCSIS cable modem, it can be understood that the invention is applicable to other cable modems, such as a Digital Audiois Visual Council (DAVIC) modem. The invention may also be implemented over any bus (PCI, USB, IEEE-1394 etc.) and for any operating system.

Figure 4:
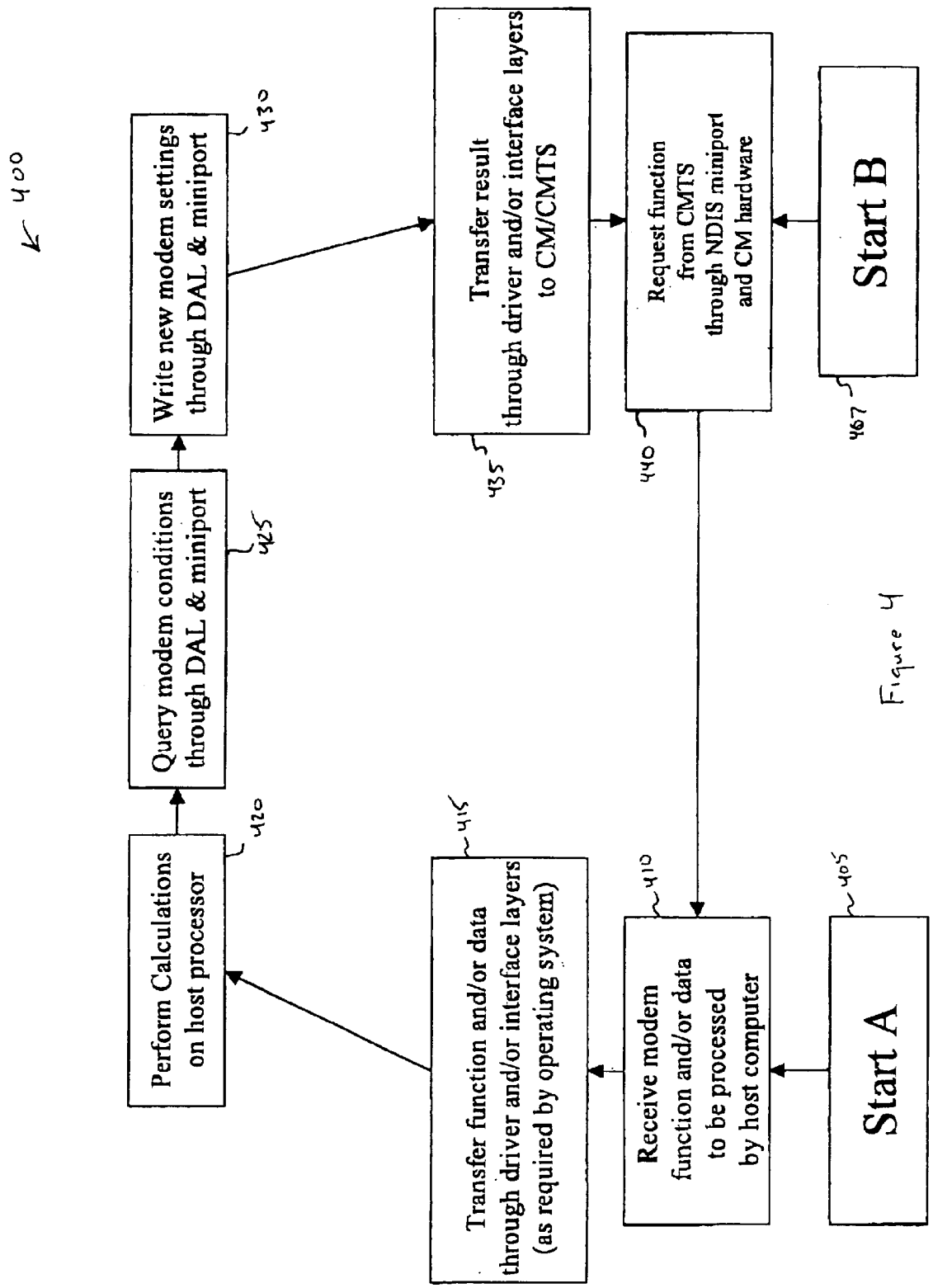
FIG. 4 is a flowchart showing the process of transferring the cable modem functions to the host computer according to one embodiment of the present invention.

FIG. 4 is a flowchart showing the process 400 of transferring the cable modem functions to a modem function processor on the host computer according to one embodiment of the present invention. The process 400 begins at start state A 405. Alternatively, the process may begin at start state B 407. From start state B 407, the process proceeds to state 440, which will be discussed below. From start state A 405, the process proceeds to state 410 where the modem function or data is received at the cable modem. The modem function is a hardware independent function generally designed to be processed by the modem.

Proceeding to state 415, the modem function or data is transferred through a driver and/or an interface layer. The modem function and/or data is transferred as required by the operating system.

Proceeding to state 420, the host processor performs calculations on the hardware independent modem function to convert into hardware specific functions. Because the host processor converts the modem functions to and from hardware specific functions, the firmulator may be universally applicable. If the type of hardware changes, only the abstraction layer needs to be changed in the modem function processor.

Proceeding to state 425, the modem conditions are queried through the DAL and the NDIS miniport driver. The abstraction layer may operate in conjunction with a hardware specific driver such as a NDIS miniport driver. The process 400 then proceeds to state 430 where the new modem settings are written through the DAL and the NDIS miniport.

Proceeding to state 435, the results of the function and/or data conversion is transferred through the driver and/or interface layers to the cable modem or cable modem termination system (CMTS). Therefore, some embedded chip such as a processor and memory may be removed from the cable modem. This allows the cable modem to be less expensive and be manufactured with less components.

Proceeding to state 440, functions may be requested from the CMTS through the NDIS miniport and the cable modem hardware. These functions are then received by the modem in state 410.

Numerous variations and modifications of the invention will become readily apparent to those skilled in the art. Accordingly, the invention may be embodied in other specific forms without departing from its spirit or essential characteristics.

What is claimed is:

1. A method of implementing cable modem functions on a host computer comprising:

receiving information which may include cable modem data and cable modem commands at the cable modem;

transferring at least a portion of the information to the host computer;

performing functions corresponding to any transferred cable modem commands on the host computer into first results;

processing any transferred cable modem data on the host computer into second results;

translating the first results into hardware specific functions;

translating the second results into hardware specific data;

executing the hardware specific functions; and transferring the hardware specific data;

wherein the cable modem functions are performed in a firmware emulator that emulates cable modem firmware that performs the cable modem functions.

2. The method of claim 1, wherein the host computer includes a cable modem abstraction layer.

3. The method of claim 2, wherein the translating is performed in by the abstraction layer.

4. The method of claim 2, wherein the abstraction layer is a DOCSIS abstraction layer.

5. The method of claim 1, wherein the modem functions performed on the host computer may be hardware independent.

6. A modem function processor comprising:

an abstraction layer which translates modem functions to and from hardware-specific functions; and a firmware emulator that emulates cable modem firmware that performs the modem function and which performs hardware independent functions.

7. The modem function processor claim 6, wherein the abstraction layer sends or receives modem commands and/or data to or from a cable modem.

8. The modem function processor claim 6, wherein the abstraction layer is a DOCSIS abstraction layer.

9. The modem function processor claim 6, wherein the firmware emulator includes a plurality of state machines and states within the state machines.

10. The modem function processor claim 9, wherein the plurality of state machines performs the cable modem functions.

11. The modem function processor claim 6, further comprising an interface to a cable modem.

12. The modem function processor claim 11, wherein the interface may include one or more intermediate software driver interface layers, such as a transport driver interface.

13. The modem function processor claim 11, wherein the interface is a direct interface.

14. A method of performing modem functions comprising:

receiving the modem commands and/or data; and distributing the modem commands and/or data among a plurality of state machines that perform respective state machine functions; and processing the state machine functions by the plurality of state machines on a host computer.

15. The method of claim 14, wherein the conversion is performed by an abstraction layer which converts between hardware specific functions and hardware independent functions.

16. The method of claim 14, wherein the modem functions art cable modem functions.

17. The method of claim 14, wherein the processing uses resources of the host computer.

\* \* \* \* \*

UNITED STATES PATENT AND TRADEMARK OFFICE
CERTIFICATE OF CORRECTION

PATENT NO. : 6,886,180 B1
DATED : April 26, 2005
INVENTOR(S) : Sandberg et al.

It is certified that error appears in the above-identified patent and that said Letters Patent is hereby corrected as shown below:

Column 5,
Line 13, delete "modern" and insert -- modem --.

Column 6,
Lines 6 and 19, delete "modern" and insert -- modem --.
Line 20, delete "art" and insert -- are --.

Signed and Sealed this

Twelfth Day of July, 2005

JON W. DUDAS
*Director of the United States Patent and Trademark Office*